United States Patent
Satake et al.

(10) Patent No.: US 8,420,243 B2
(45) Date of Patent: Apr. 16, 2013

(54) BATTERY PACK

(76) Inventors: Mikio Satake, Kanagawa (JP); Tomo Nishikawa, Torrance, CA (US)

( * ) Notice: Subject to any disclaimer, the term of this patent is extended or adjusted under 35 U.S.C. 154(b) by 558 days.

(21) Appl. No.: 12/226,427

(22) PCT Filed: May 25, 2006

(86) PCT No.: PCT/JP2006/310459
§ 371 (c)(1),
(2), (4) Date: Aug. 6, 2010

(87) PCT Pub. No.: WO2007/122738
PCT Pub. Date: Nov. 1, 2007

(65) Prior Publication Data
US 2010/0310915 A1  Dec. 9, 2010

(30) Foreign Application Priority Data

Apr. 20, 2006 (JP) ................................ 2006-010208
Apr. 24, 2006 (JP) ................................ 2006-118785

(51) Int. Cl.
*H01M 2/10* (2006.01)
(52) U.S. Cl.
USPC ........................................... 429/99; 429/159
(58) Field of Classification Search ............. 429/99
See application file for complete search history.

(56) References Cited

U.S. PATENT DOCUMENTS 5,626,979 A * 5/1997 Mitsui et al. ............... 429/97
2005/0202315 A1 * 9/2005 Sugeno et al. ............ 429/156

FOREIGN PATENT DOCUMENTS

| EP | 1411579 | 4/2004 |
| JP | 11-354089 | 12/1999 |
| JP | 3583143 | 8/2004 |
| JP | 3614158 | 11/2004 |
| WO | 97/19475 | 5/1997 |

* cited by examiner

*Primary Examiner* — Jonathan Crepeau
(74) *Attorney, Agent, or Firm* — Kubovcik & Kubovcik

(57) ABSTRACT

Two batteries are made mountable like a cartridge in a housing to achieve the large capacity of a battery pack and to improve the facilitation of operation such as replacement of a battery.
The battery pack includes covers 2, 3 having four circumferential lateral surfaces one of which is opened; a lid body 5 opening and closing the opened lateral surface 4 of the housings; and a plurality of batteries 6a, 6b attached into and removed from the inside of the housing. The housing are formed to be divided in two portions one of which is a top cover 2 having the open lateral surface, another one of the two portions being a rear cover 3 mounted with a control substrate mounted thereon. The inside of the top cover is vertically divided in two by a partition plate 8 to form battery-storing portions 9a and 9b which can store the battery cartridges 6a and 6b, respectively.

6 Claims, 11 Drawing Sheets

BATTERY PACK

TECHNICAL FIELD

The present invention is relates to a battery pack in which cartridge-like batteries are stored in an attachable and removable manner.

BACKGROUND ART

In a large-sized video camera called one for business-use or for professional-use such as TV camera, a battery cell or a pack combining a plurality of battery cells and a substrate are stored between a rear cover and a top cover, which are secured to each other by welding, adhesive bonding, or the like, as shown in e.g. patent document 1. For example, covers divided in two are pressurized and heated by ultrasound to be melted and solidified for joining. The battery pack formed as described above has such features that it can be configured to have a simple structure and to be compact and staunch as compared with covers that are screw-fastened to each other for fixation and thus can be manufactured inexpensively.
[Patent Document 1]
International Publication WO01/073879

DISCLOSURE OF INVENTION

The covers joined together by ultrasound welding or the like can make the battery pack staunch; however, the covers cannot be opened in the event that the battery cell incorporated may cause trouble or the like. Because of relatively expensive, the battery pack has needed to be easily maintained.

It is an object of the present invention to provide a battery pack that not only, while focusing on the development of a cartridge-like battery incorporating one or more cells, can achieve high-capacity by storing such a plurality of battery cartridge therein, but can easily perform maintenance such as replacement or the like.

A battery pack of the present invention includes: a housing having four circumferential lateral surfaces one of which is opened; a lid body opening and closing the opened lateral surface of the housing; and a plurality of batteries attached to and detached from the inside of the housing. The housing is formed to be divided in two portions one of which is a top cover having the opened lateral surface and another one of the two portions is a rear cover mounted with a control substrate thereon. The inside of the top cover is partitioned by a partition plate into upper and lower battery-storing portions in each of which a cartridge-like battery can be stored. The lid body is opened and closed to open and close the open lateral surface of the housing so that the cartridge-like battery can be attached and removed. Such a configuration not only can achieve high-capacity by use of a plurality of batteries but can facilitate maintenance such as replacement or the like.

In the battery pack of the invention, the control substrate is mounted on the rear cover, a substrate cover is provided to cover the control substrate, and a projecting portion is provided on the substrate cover so as to project upward to carry the partition plate. The battery pack of this type is usually provided with a self-capacity output circuit and with a self-capacity output terminal to output remaining capacity to be displayed in the finder of a video camera or the like. The substrate adapted to control such data output is covered by the substrate cover so as not to be affected by other constituent elements inside the housing.

In the battery pack of the invention, a groove-like portion is provided at an end-edge of the opened lateral surface of the upper housing so as to attach thereto and remove therefrom the lid body by linearly sliding the lid body along a circumferential direction, and a recessed portion is provided at an end-edge of the opened lateral surface of the lower housing so as to be able to be fitted to a small projecting portion provided on the lid body. Thus, the lid body can easily be moved along the edge of the open lateral surface, can easily be positioned and can be made hard to disengage.

In the battery pack of the invention, a taking-out tub portion is provided on the opened lateral surface side of the partition plate so as to rise therefrom. This tub portion can control the release of the battery cartridge. For example, if the tub portion is configured to face the rear cover side, it usually restrains the movement of the battery cartridge mounted on the substrate cover and makes it possible for the battery cartridge to be freely movable only when the lid body is removed.

In the battery pack of the invention, a positioning projecting portion is provided on the partition plate so as to be abutted against an inner surface of a top surface of the top cover. This projecting portion and the projecting portion of the substrate cover described earlier can accurately position the partition plate so that the battery cartridge-storing space can accurately be defined inside the housing.

In the battery pack of the invention, an electrical and mechanical portion to be connected to other equipment such as a TV camera is provided on a rear surface of the rear cover and one lateral surface, and an inclined surface is provided at both lateral edges of the rear cover to prevent interference with the other equipment such as a TV camera. Other equipment such as a TV camera is formed with various projections due to some convenience for the manufacturer thereof. In particular, projections adapted to restrict the lateral surface position of the battery pack often hinder another company's equipment from being attached. However, since the inclined surface portion is provided, situations of avoiding such hindrance increase.

The battery pack of the present invention has effects such that the cartridge-like batteries can simply be attached and removed, use of a plurality of the batteries can achieve high-capacity and operation such as the attachment-removal and replacement of the battery can be facilitated.

EXPLANATION OF REFERENCE NUMERALS

Figure 1:
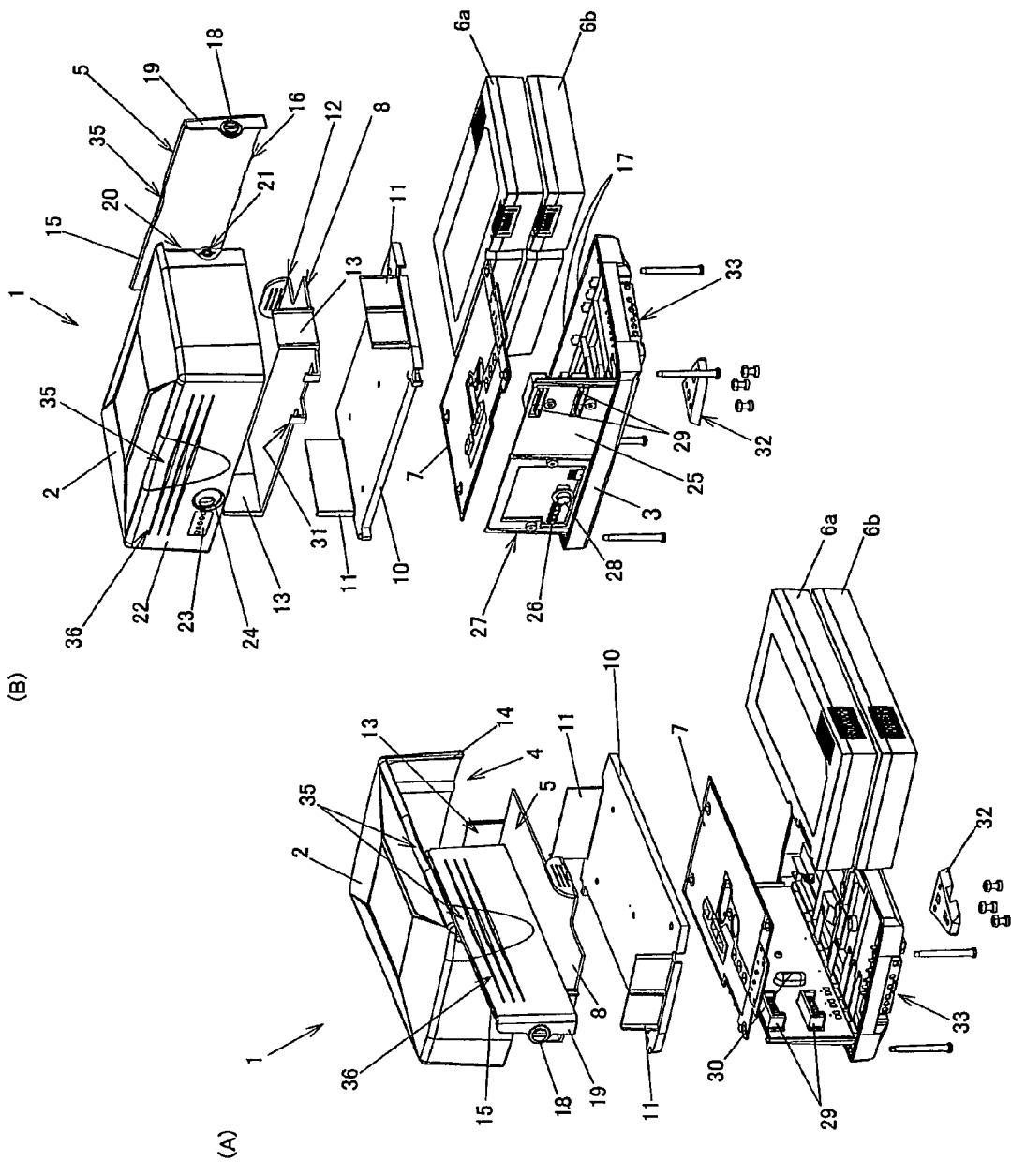
FIG. 1 is an exploded perspective view of a battery pack according to the present invention.

1 Battery pack
2 Top cover
3 Rear cover
3a Lateral surface as a bottom surface of the rear cover 3
4 Open lateral surface
5 Slide cover
6a, 6b Battery cartridge
7 Control substrate
8 Partition plate
9a, 9b Battery-storing portion
10 Substrate cover
11 Projecting wall portion
12 Release tub
13 positioning projecting wall portion
14 Groove-like portion
15 Projecting ridge
16 Small projecting portion
17 Recessed portion
18 Locking screw
19 Folded portion
20 Portion corresponding to the folded portion
21 Locking screw receiver
22 Surface opposite to an open lateral surface of the top cover 2
23 LED display section
24 Push button
25 Receiving plate
26 LED substrate
27 LED substrate guide
28 Push button receiver
29 Battery contact connector
30 Positioning boss
31 Hook
32 V-shaped locking plate
33 Terminal portion
34 Inclined surface portion
35 Recessed portion
36 Projecting ridge as slip stopper

BEST MODE FOR CARRYING OUT THE INVENTION

Best mode for carrying out the present invention will hereinafter be described with reference to the drawing.

[Embodiment]

FIG. 1 is an exploded perspective view of a battery pack according to an embodiment of the present invention. A battery pack 1 of the present embodiment mainly includes a top cover 2, a rear cover 3, a slide cover 5, and a plurality of cartridge-like batteries (hereinafter, referred to as the battery cartridges) 6a and 6b. The top cover 2 with four circumferential lateral surfaces one of which is opened and the rear cover 3 constitute a housing. The slide cover 5 serves as a lid body that opens and closes an open lateral surface 4 of the housing constituted by the top cover 2 and rear cover 3. The battery cartridges 6a, 6b are removably attached to the inside of the housing constituted by the top cover 2 and rear cover 3.

Figure 4:
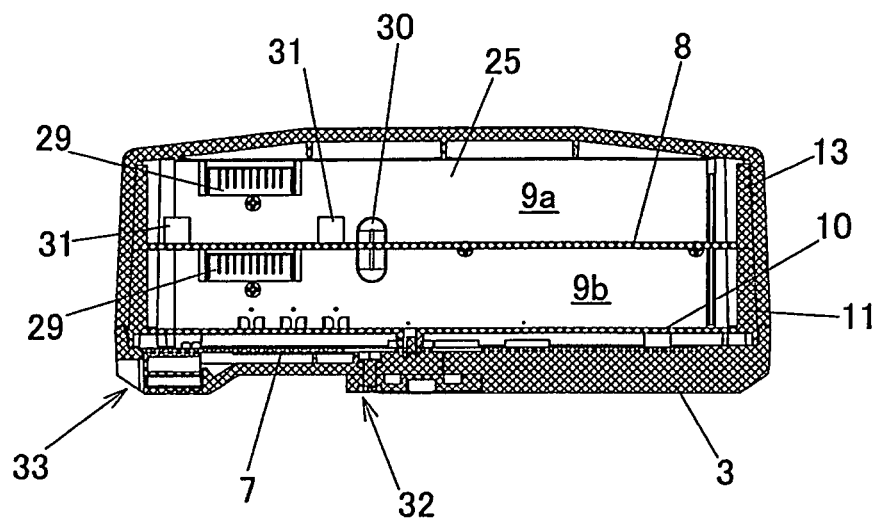
FIG. 4 is a cross-sectional view taken along line A-A of FIG. 2.
Figure 5:
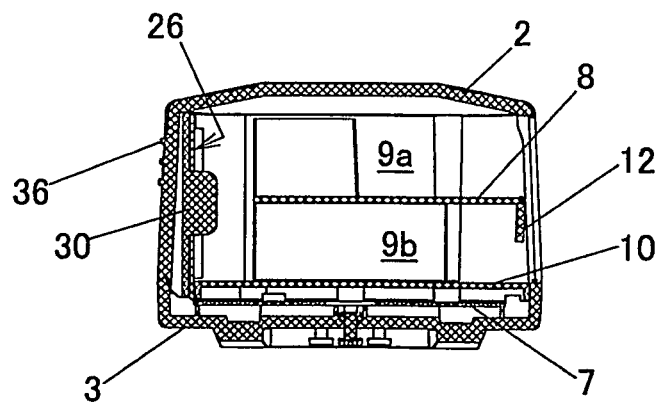
FIG. 5 is a cross-sectional view taken along line B-B of FIG. 2.
Figure 6:
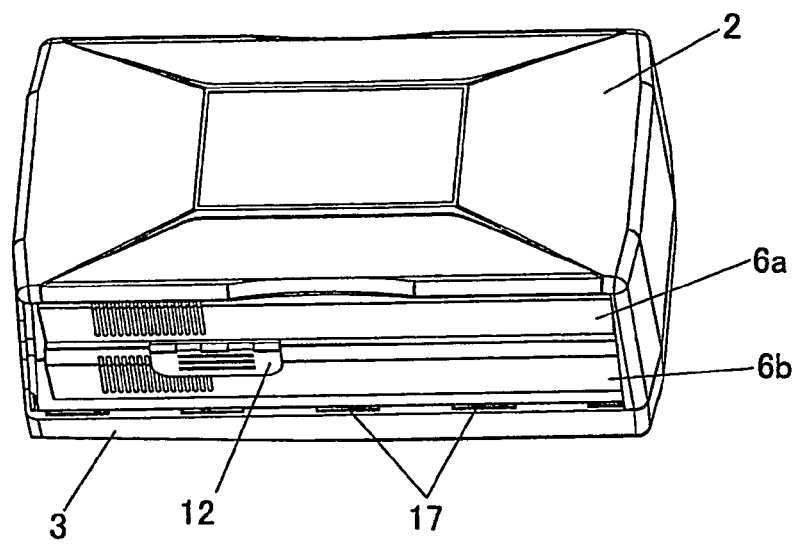
FIG. 6 is a perspective view of the battery pack with a slide cover removed.
Figure 7:
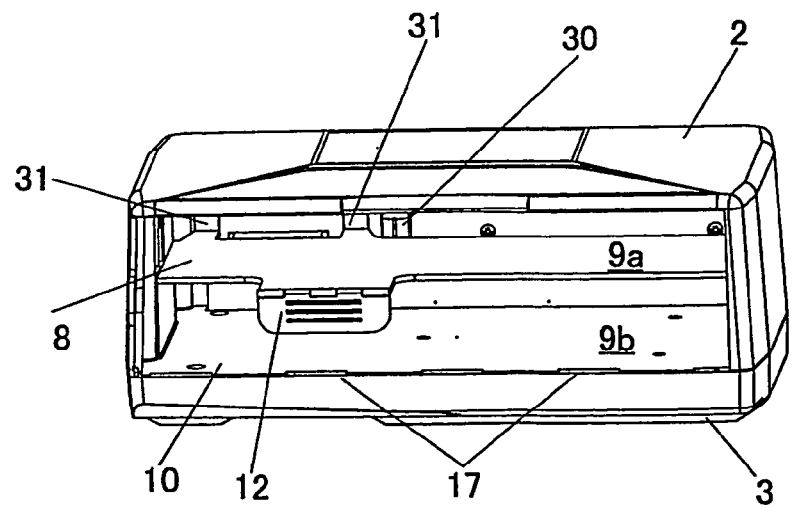
FIG. 7 is a perspective view illustrating a state of removing battery cartridges from the state of FIG. 6.
Figure 8:
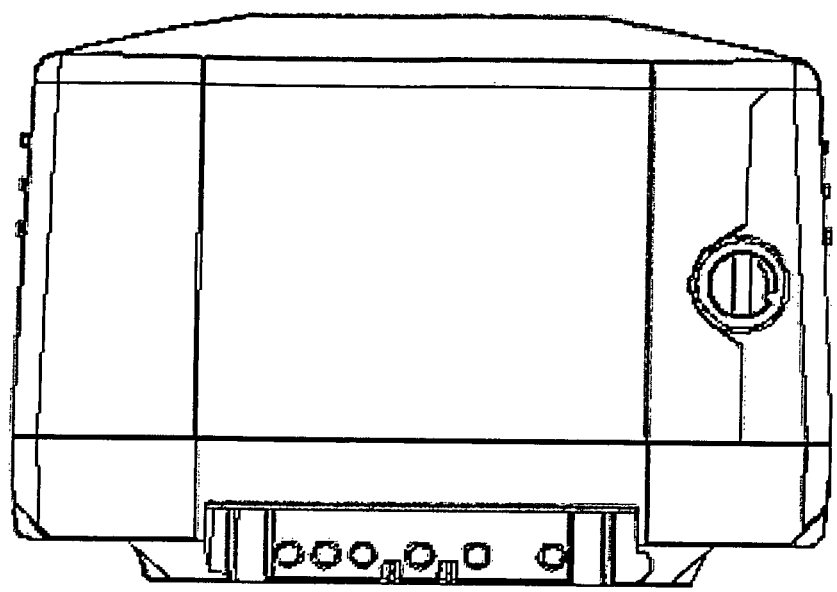
FIG. 8 is a front view of the battery pack according to the present invention.
Figure 9:
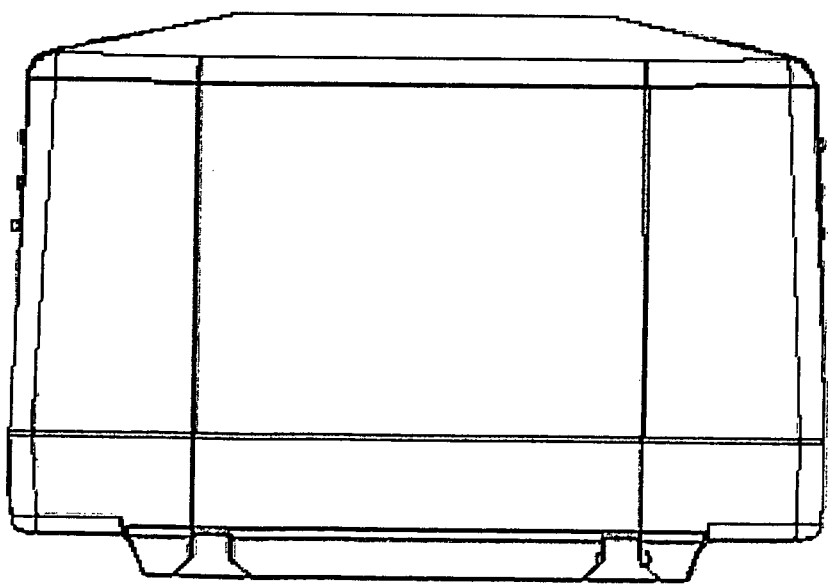
FIG. 9 is a rear view of the battery pack according to the present invention.
Figure 10:
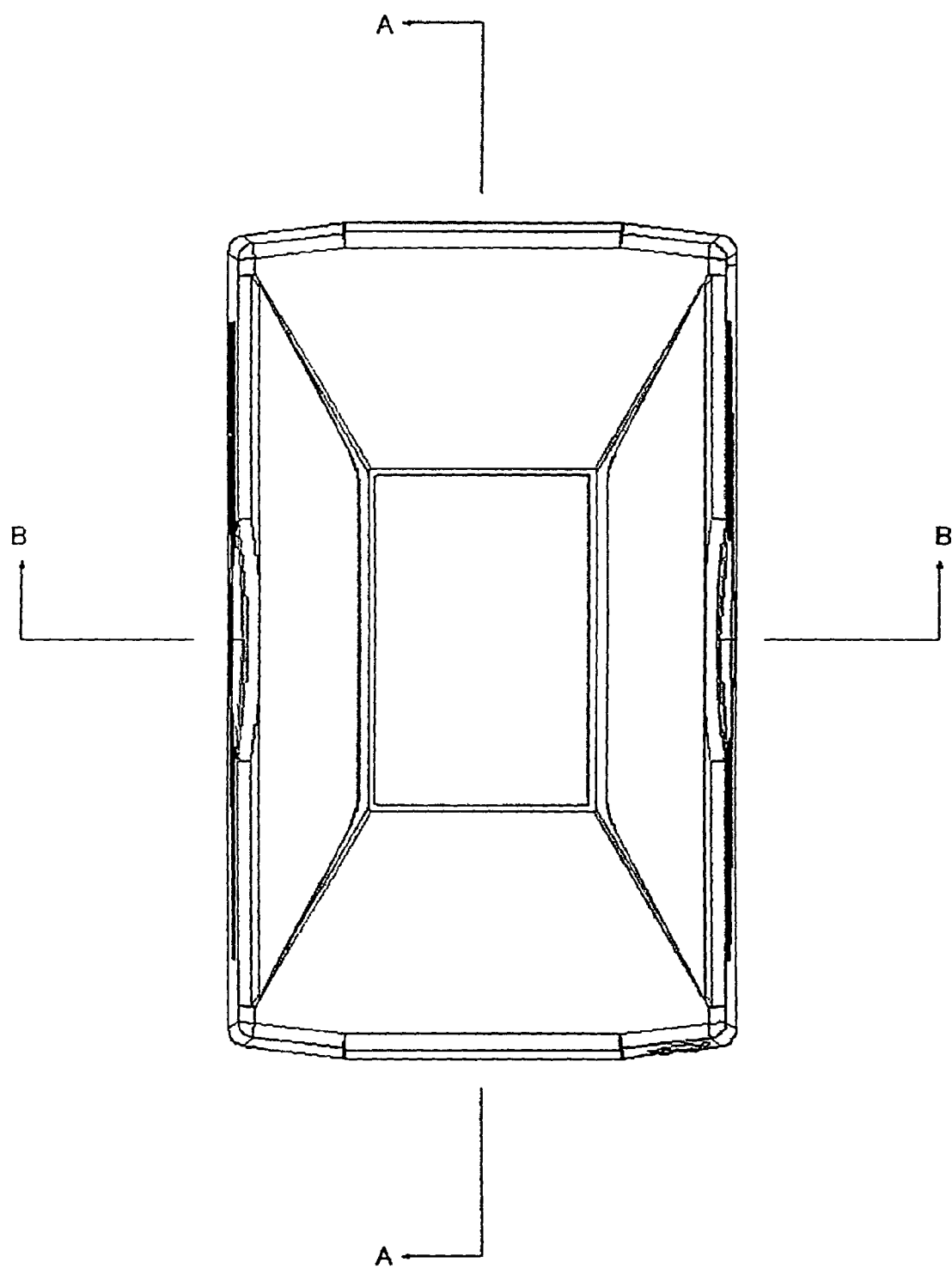
FIG. 10 is a plan view of the battery pack according to the present invention.
Figure 11:
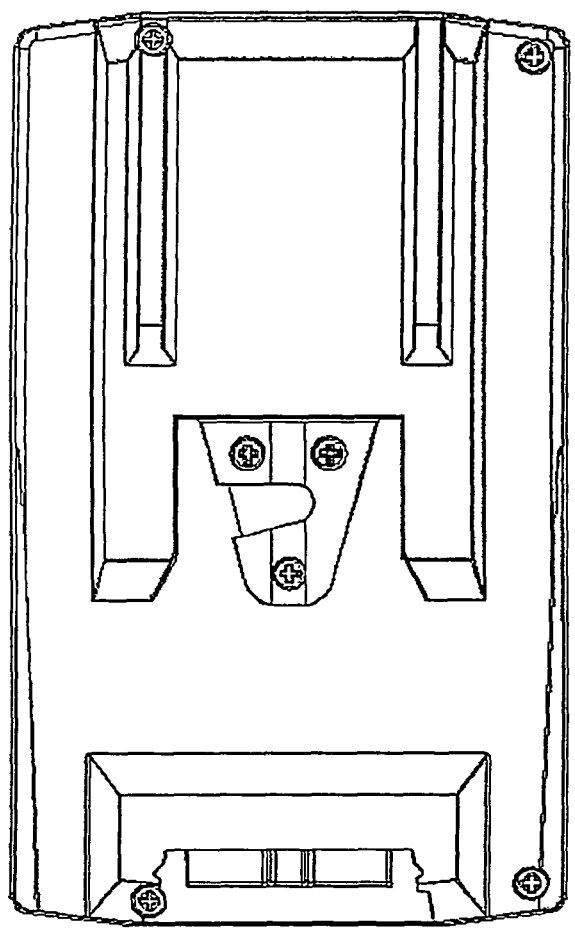
FIG. 11 is a bottom view of the battery pack according to the present invention.
Figure 12:
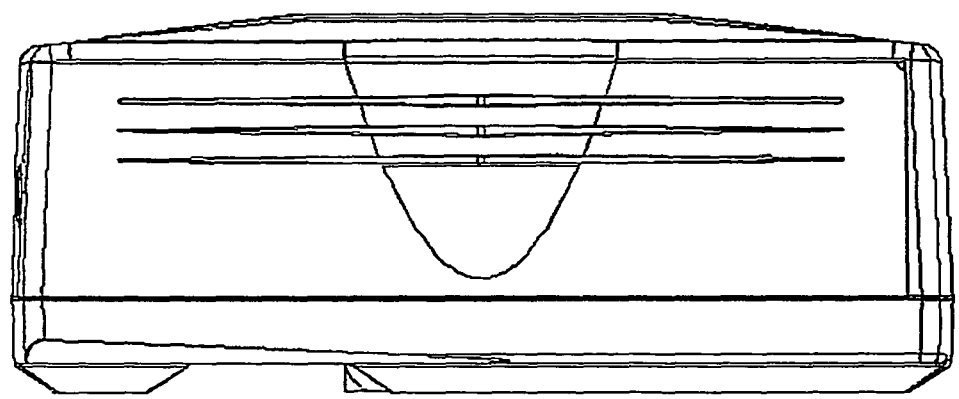
FIG. 12 is a right lateral view of the battery pack according to the present invention.
Figure 13:
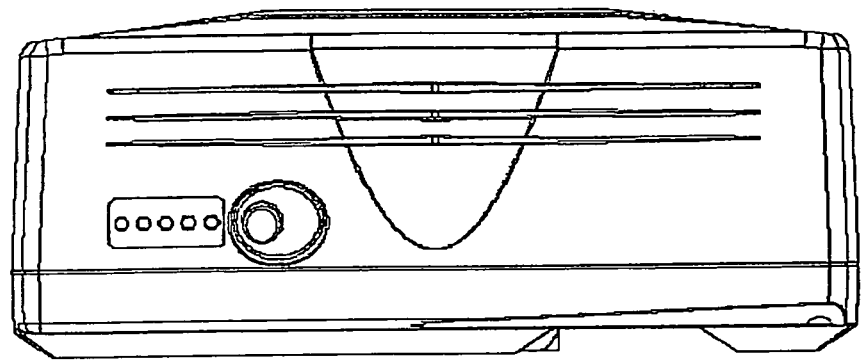
FIG. 13 is a left lateral view of the battery pack according to the present invention.
Figure 14:
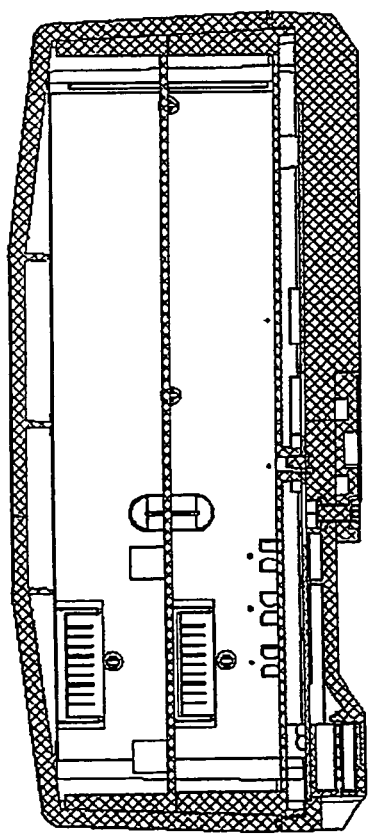
FIG. 14 is a cross-sectional view of the battery pack with the battery cartridges incorporated therein omitted, taken along line A-A.
Figure 15:
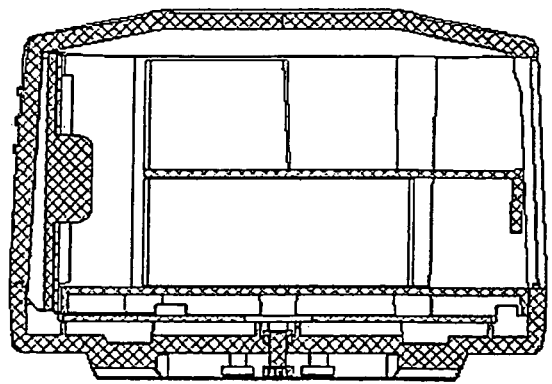
FIG. 15 is a cross-sectional view of the battery pack with the battery cartridges incorporated therein omitted, taken along line B-B.
Figure 16:
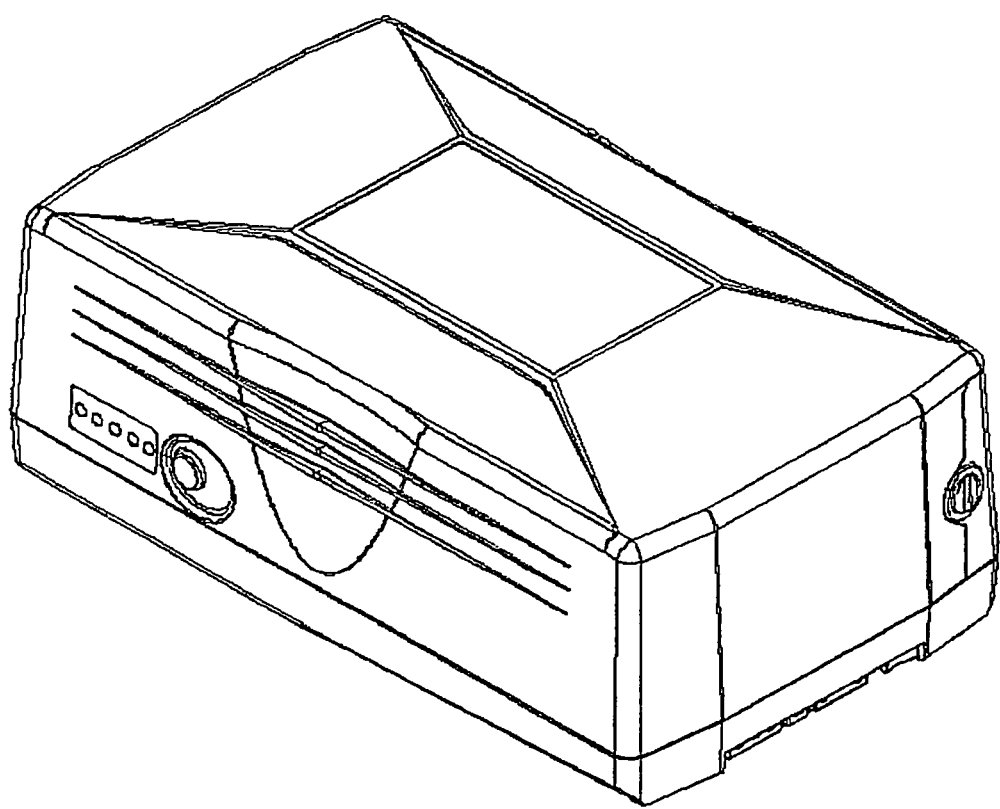
FIG. 16 is a perspective view of the battery pack according to the present invention.
Figure 17:
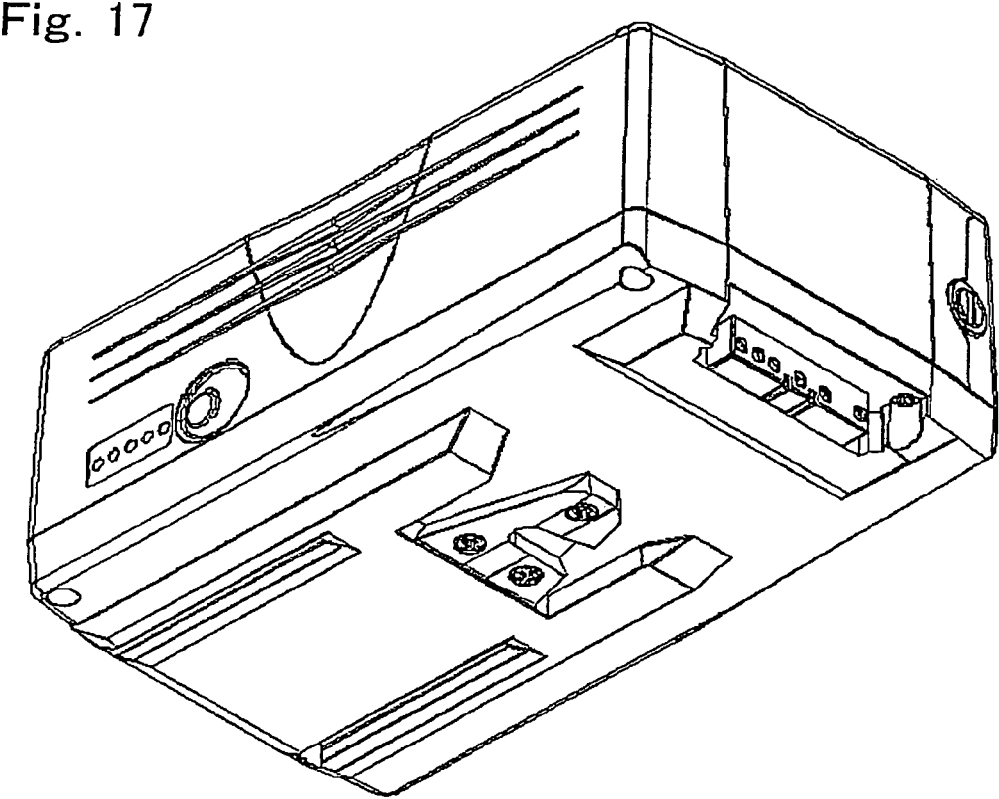
FIG. 17 is a perspective view of the battery pack as viewed from the bottom side thereof.
Figure 18:
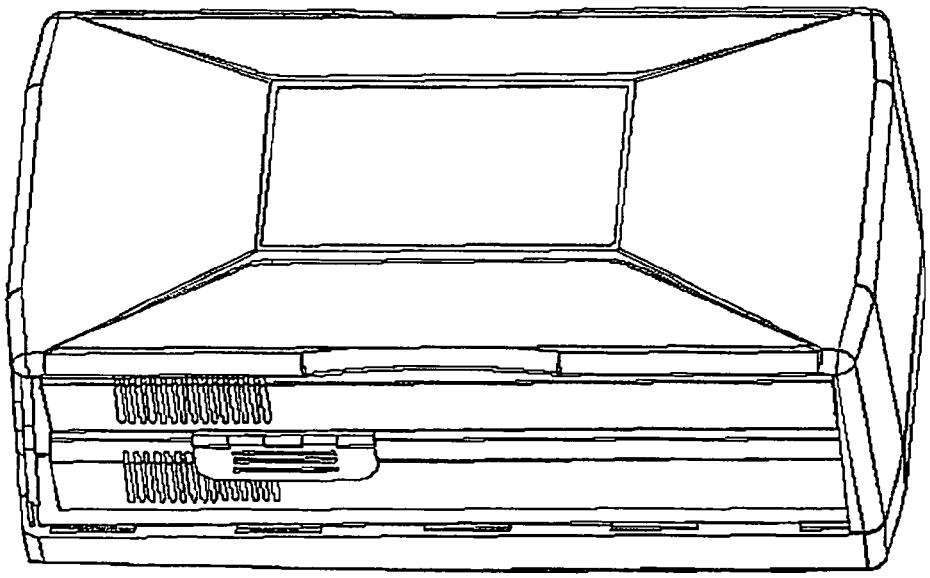
FIG. 18 is a reference drawing of the battery pack relating to the invention with a right lateral cover removed.

Specifically, the housing is formed to be divided in two portions one of which is the top cover 2 having the open lateral surface 4 and another one of the two portions is the rear cover 3 mounted with a control substrate 7 thereon. In addition, the inside of the top cover 2 is vertically divided in two by a partition plate 8 to form battery-storing portions 9a and 9b which can store the battery cartridges 6a and 6b, respectively (see FIGS. 4, 5 and 7, etc.) In this way, the open lateral surface 4 of the housing is opened and closed by opening and closing the slide cover 5 so that the battery cartridges 6a, 6b can individually be attached and removed. Thus, not only high-capacity can be achieved by use of the plurality of batteries but maintenance such as replacement or the like can be performed easily and simply.

The control substrate 7 is mounted on the rear cover 3 as described above and covered by a substrate cover 10. Pair of projecting wall portions 11, 11 are provided on the substrate cover 10 so as to project upward therefrom to carry the lower surface of the partition plate 8. Needless to say, the position where the projecting wall portions are provided corresponds to that of both ends of the open lateral surface 4.

The control substrate 7 exercises control for outputting remaining capacity to be displayed in the finder of a video camera or the like, which is usually performed by battery packs of this type. To that end, the control substrate 7 is provided with a self-capacity output circuit and with self-capacity output terminals. The substrate 7 adapted to control such data output is covered by the substrate cover 10 so as not to be affected by other constituent elements inside the housing.

A taking-out release tub 12 is provided at an edge of the partition plate 8 on the side of the open lateral surface 4. This release tub 12 is provided at the edge of the partition plate 8 in a vertically turnable manner so as to control the release of the battery cartridges 6a, 6b, particularly, of the battery cartridge 6b on the lower side in the figure. That is to say, for example, the release tub 12 may usually face the rear cover 3 and the battery cartridge 6b may be inserted by lifting the release tub 12 when attached. In such a configuration, the movement of the lower side battery cartridge 6b mounted on the substrate cover 10 is usually restrained but it can be made free only when the slide cover 5 is removed.

Further, pair of positioning projecting walls 13, 13 are provided on the partition plate 8 so as to be abutted against the internal top surface of the top cover 2. The partition plate 8 is surely positioned by these projecting walls 13, 13 and by the projecting wall portions 11, 11 so that the respective battery-storing portions 9a, 9b of the battery cartridges 6a, 6b are accurately defined in the housing.

Although detailed depiction is omitted, a groove-like portion 14 is provided at an edge portion, facing the open lateral surface 4, of the top cover 2 constituting part of the housing. The groove-like portion 14 is adapted to attach thereto and detach therefrom the slide cover 5 by linearly sliding the slide cover 5 along the outer circumferential direction. A projecting ridge 15 is provided at an upper edge and an end-edge of the slide cover 5 so as to be able to be fitted to the groove-like portion 14, the end-edge being the forefront when the slide cover 5 is moved in the closing direction. In addition, a recessed portion 17 is provided on an end-edge, facing the open lateral surface 4, of the rear cover 3 so as to be able to fitted to a small projection 16 provided at a lower edge, in the figure, of the slide cover 5 (see FIG. 7). In this way, the slide cover 5 is easily moved and positioned along the edge of the open lateral surface 4 and is difficult to disengage therefrom. Incidentally, in the figure, reference numeral 18 denotes a locking screw. A folded portion 19 is provided at an end-edge of the slide cover 5, the end-edge being the forefront when the slide cover 5 is moved in the closing direction. A portion 20, of the top cover 2, corresponding to the folded portion 19 is notched to be recessed. A locking screw receiver 21 is provided at an edge of the portion 20. The locking screw 18 is screwed to the locking screw receiver 21 to secure the slide cover 5.

An LED display section 23 for displaying a remaining level or the like and a push button 24 for performing operation of displaying and checking a remaining level are provided on a surface 22, of the top cover 2, opposed to the open lateral surface 4.

Incidentally, a receiving plate 25 for a substrate or the like described later is provided at an edge, opposite to the open lateral surface 4, of the rear cover to rise therefrom along the inner surface side of the above-mentioned surface 22. An LED substrate 26, an LED substrate guide 27 and a push button receiver 28 are provided on the receiving plate 25 on the side of the surface 22. A pair of battery contact connectors 29, 29 are provided to face the side opposite to the surface 22, i.e., to face the inside of the housing. In addition, a boss 30 for positioning or indexing the LED substrate guide 27 is provided at a generally central portion of the receiving plate 25. Incidentally, reference numeral 31 in the figure denotes a hook provided to restrict a thrusting-in position of the upper battery cartridge 6a.

In the battery pack 1 of the present embodiment, electrical and mechanical portions (a V-shaped locking plate 32, terminal portions 33 and the like) to be connected to other equipment such as a TV camera or the like are provided on a rear surface of the rear cover 3 and on a lateral surface 3a which is a bottom surface in the figure. In addition, inclined surface portions 34, 34 are provided at both lateral edges of the rear surface of the rear cover 3 to prevent interference with the projections of other equipment such as a TV camera or the like. Since the electrical and mechanical portions to be connected to other equipment such as a TV camera are well-known mechanisms, their explanations are omitted.

The inclined surface portion 34 is provided to extend to the approximate middle of the rear surface of the rear cover 3. The inclined surface portion 34 is formed such that it is broad on the side of the lateral surface 3a which is the bottom surface and is more narrowed in width as it goes to the longitudinal central portion of the battery pack 1. In addition, the inclined surface portion 34 disappears at the generally central portion. Other equipment such as a TV camera is formed with various projections due to some convenience for the manufacturer thereof. In particular, projections adapted to restrict the lateral surface position of the battery pack often hinder another company's equipment from being attached. However, since the inclined surface portions 34 are provided at both the lateral edges of the rear cover 3 as described above, situations of avoiding such hindrance increase. Needless to say, the shape of the inclined surface 34 can appropriately be modified.

Figure 2:
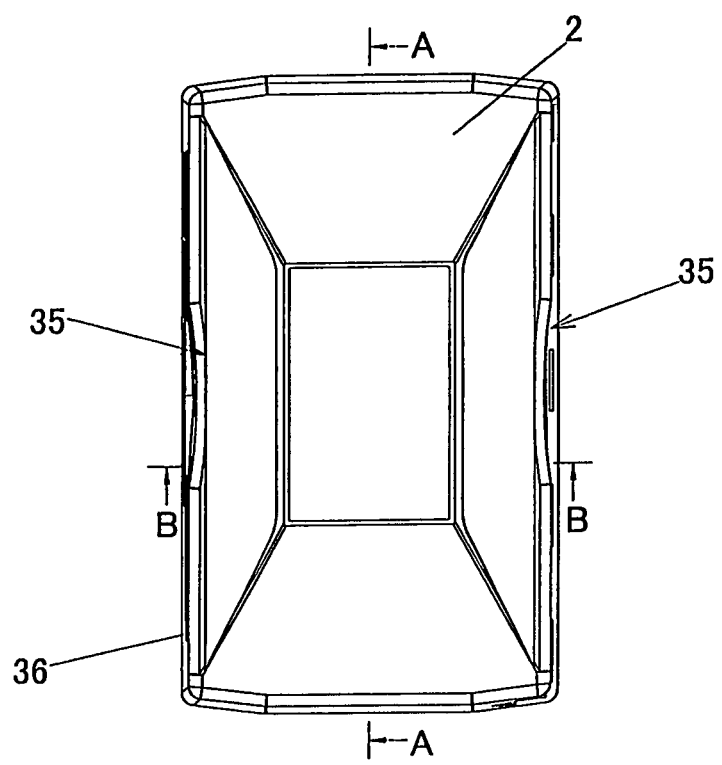
FIG. 2 is a plan view of a battery pack according to the present invention.
Figure 3:
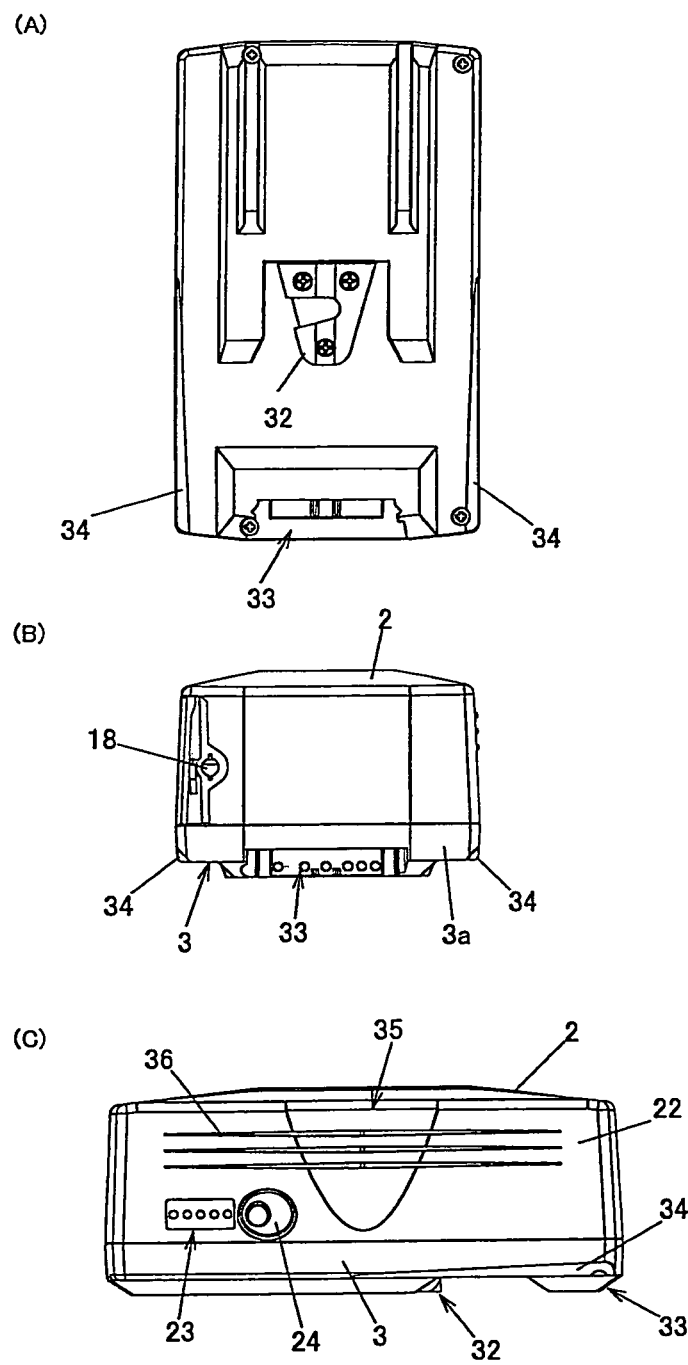
FIG. 3 includes a rear view (A), a bottom view (B) and a lateral view (C), illustrating the battery pack.

The shape of the battery pack 1 according to the present embodiment is further described with reference to FIG. 2. Both the upper edges of the top cover 2, the lateral surface 22 and the slide cover 5 are slightly curved and recessed only in the vicinity of the longitudinal center of the battery pack 1. The recessed portion 35 is formed parabolic as shown in FIG. 1; however, it may be appropriately formed. This is because the battery pack 1 can easily be grabbed by a person's hand compared with the case where the battery pack 1 formed of simple flat surfaces. Incidentally, a plurality of projecting ridges 36 are provided at the recessed portion 35 as slip stoppers acting when the battery pack 1 is grabbed so as to straddle the recessed portion 35. A recessed portion may be provided instead of the projecting ridges 36.

Incidentally, the upper surface of the top cover 2 is formed like a truncated pyramid with low height. This is because of making it easy to grab the battery pack 1.

The present invention is not limited to the embodiment as described above and as illustrated and can be modified in various ways without departing from the claims.

The invention claimed is:

1. A battery pack comprising:
a housing having four circumferential lateral surfaces one of which is opened;
a lid body opening and closing the opened lateral surface of the housing; and
a plurality of batteries attached to and removed from the inside of the housing;
wherein the housing is formed to be divided in two portions one of which is a top cover having the opened lateral surface, another one of the two portions being a rear cover mounted with a control substrate thereon, the inside of the top cover being partitioned by a partition plate into upper and lower battery-storing portions in each of which a cartridge-like battery can be stored.

2. The battery pack according to claim 1, wherein the control substrate is mounted on the rear cover, a substrate cover is provided to cover the control substrate, and a projecting portion is provided on the substrate cover so as to project upward to carry the partition plate.

3. The battery pack according to claim 2, wherein a groove-like portion is provided at an end-edge of the opened lateral surface of the top cover so as to attach thereto and detach therefrom the lid body by linearly sliding the lid body along a circumferential direction and a recessed portion is provided at an end-edge of the opened lateral surface of the rear cover so as to be able to be fitted to a small projecting portion provided on the lid body.

4. The battery pack according to claim 3, wherein a taking-out tub portion is provided on the opened lateral surface side of the partition plate so as to rise therefrom.

5. The battery pack according to claim 4, wherein a positioning projecting portion is provided on the partition plate so as to be abutted against an inner surface of a top surface of the top cover.

6. The battery pack according to claim 5, wherein an electrical and mechanical connecting portion to other equipment is provided on a rear surface of the rear cover and one lateral surface, and an inclined surface is provided at both lateral edges of the rear cover to prevent interference with the other equipment.

* * * * *